(12) United States Patent
Boberg et al.

(10) Patent No.: US 7,339,940 B2
(45) Date of Patent: Mar. 4, 2008

(54) TARGETED MESSAGING TO END USER TERMINAL CONNECTED TO A SERVICE NODE IN A COMMUNICATIONS NETWORK

(75) Inventors: Christer Boberg, Västerhaninge (SE); Thommy Eklöf, Ingarö (SE); Mats Eriksson, Åkersberga (SE); Åke Gustafsson, Huddinge (SE); Börje Persson, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1105 days.

(21) Appl. No.: 10/276,073

(22) PCT Filed: May 18, 2001

(86) PCT No.: PCT/SE01/01116

§ 371 (c)(1), (2), (4) Date: Mar. 7, 2003

(87) PCT Pub. No.: WO01/89243

PCT Pub. Date: Nov. 22, 2001

(65) Prior Publication Data

US 2003/0163588 A1    Aug. 28, 2003

(30) Foreign Application Priority Data

May 18, 2000   (SE)   .................................... 0001842

(51) Int. Cl.
*H04L 12/28* (2006.01)

(52) U.S. Cl. ...................... 370/401; 370/328; 709/217; 709/203

(58) Field of Classification Search ................ 709/206, 709/207, 217, 204; 370/312; 455/412.1, 455/412.2; 719/314
See application file for complete search history.

(56) References Cited

U.S. PATENT DOCUMENTS

| | | | | |
|---|---|---|---|---|
| 4,714,992 A * | 12/1987 | Gladney et al. | ............ | 707/206 |
| 6,260,059 B1 * | 7/2001 | Ueno et al. | ................. | 709/202 |
| 6,263,212 B1 * | 7/2001 | Ross et al. | ................. | 455/466 |
| 6,449,287 B1 * | 9/2002 | Leuca et al. | ................ | 370/468 |
| 6,466,788 B1 * | 10/2002 | Carlsson | ................. | 455/435.2 |
| 6,842,767 B1 * | 1/2005 | Partovi et al. | ............. | 709/203 |
| 7,072,932 B1 * | 7/2006 | Stahl | .......................... | 709/203 |
| 7,103,018 B1 * | 9/2006 | Hansen et al. | ............. | 370/328 |
| 2003/0140112 A1 * | 7/2003 | Ramachandran et al. | ... | 709/217 |
| 2005/0246423 A1 * | 11/2005 | Starbuck et al. | ............ | 709/206 |

FOREIGN PATENT DOCUMENTS

| WO | WO 97/41654 | 11/1997 |
|---|---|---|
| WO | WO 99/33293 | 7/1999 |

* cited by examiner

*Primary Examiner*—Bob A. Phunkulh

(57) ABSTRACT

Targeted messaging, for example advertisements, may be provided to a user terminal connectable to a service node in a communications network, said network comprising a library node connected to the service node and comprising messages, such as advertisements, in different formats for different access types, by the following steps: requesting the delivery of at least one message from the library node to the service node for distribution to the user terminal, while specifying in the request the access type used by the user terminal, and providing from the library node to the service node the appropriate version of the at least one message in dependence of the access type used by the user terminal. One or more parameters, such as demographic data, may be specified for how to select a message from the library node.

12 Claims, 1 Drawing Sheet

TARGETED MESSAGING TO END USER TERMINAL CONNECTED TO A SERVICE NODE IN A COMMUNICATIONS NETWORK

TECHNICAL FIELD

The present invention relates to a method and a computer program product for providing personalized messages to subscribers in a communications network.

DESCRIPTION OF RELATED ART

There is a desire to provide services free of cost in all kinds of communication networks. One way of financing such services is for the subscriber receiving a service to accept a certain amount of advertisement. In this case, the advertisement must be added to the information requested by the subscriber, for example, by means of a push server in the network providing information to a corresponding push client in the subscriber's terminal. Preferably, also, the advertisement received should somehow match the subscriber's profile. Such a solution for use in the Internet is disclosed the international patent application PCT/SE99/01454.

Another method for sending targeted information to selected groups of individuals, for example in dependence of demographic data, is known as narrowcast. Narrowcast today allows targeted messages, mainly advertisements, to be sent to the selected group of individuals through the traditional Internet, for example, in the form of banners.

This solution works well in Internet type networks using HTTP and HTML. Most mobile terminals today do not comprise push clients and would therefore not be able to receive information from a push server based on the same client-server technology. For the same reason, also, no unified standard has evolved for providing Internet-like services in mobile networks. Instead, each service provider has developed a proprietary solution for providing such services.

There are other applications, too, in which personal messages must be sent to mobile subscribers without having been requested, such as emergency information and distribution of work tasks for mobile service personnel.

OBJECT OF THE INVENTION

It is an object of the present invention to enable the delivery of personal messages to a mobile subscriber regardless of the type of terminal, service and operator network used by the mobile subscriber.

SUMMARY OF THE INVENTION

This object is achieved according to the invention by a method of providing at least one message to an end user terminal connectable to a service node in a communications network, said network comprising a library node connected to the service node and the library node comprising at least a first and a second version of a first message, said versions being adapted for terminals using different access types, said method comprising the following steps:
requesting the delivery of at least one message from the library node to the service node for distribution to the terminal, while specifying in the request the access type used by the terminal, and
providing from the library node to the service node the appropriate version of the at least one message in dependence of the access type used by the terminal.

With the solution according to the invention, messages, such as advertisements, can be provided to any type of end user terminal, service and operator network, including terminals not comprising a push client.

According to a preferred embodiment, the method further comprises the steps of providing at least a first and a second version of a second message in the library node, specifying in said request at least one parameter to be used when selecting the message to be provided from the library node to the service node, and selecting a message from the library node in accordance with said at least one parameter.

Each message can then be provided in different versions for different terminals, and the appropriate version can be selected and provided to a terminal upon request. No conversion is required to provide the appropriate format to each terminal.

The requesting step is initiated by the step of requesting a service from the service node to the terminal. In this way, an advertisement of the appropriate format may be provided together with the requested service.

Said at least one parameter may include information concerning the following:
the service requested,
the momentary geographical position of the mobile terminal,
the capabilities of the terminal,
the identity of the user of the terminal,
the size of the advertisement
the service provider identity
and/or other parameters as found appropriate.

This will enable selection of messages, for example to provide targeted personalized advertisements to a subscriber.

According to a preferred embodiment, the terminal is a mobile terminal and the network is a communications network.

The object is also achieved by a computer program product for use between a service node and a library node in a communications network, said library node comprising at least a first and a second version of at least a first message, said computer program product comprising software code means which, when run on a computer causes such a method to be performed.

Although the method and program have primarily been developed to suit mobile terminals in mobile communications networks, they obviously work in exactly the same way with wired terminals.

BRIEF DESCRIPTION OF THE DRAWINGS

In the following the invention will be described by way of example only, in terms of preferred embodiments, with reference to the appended drawings, in which.

DETAILED DESCRIPTION OF EMBODIMENTS

Figure 1:
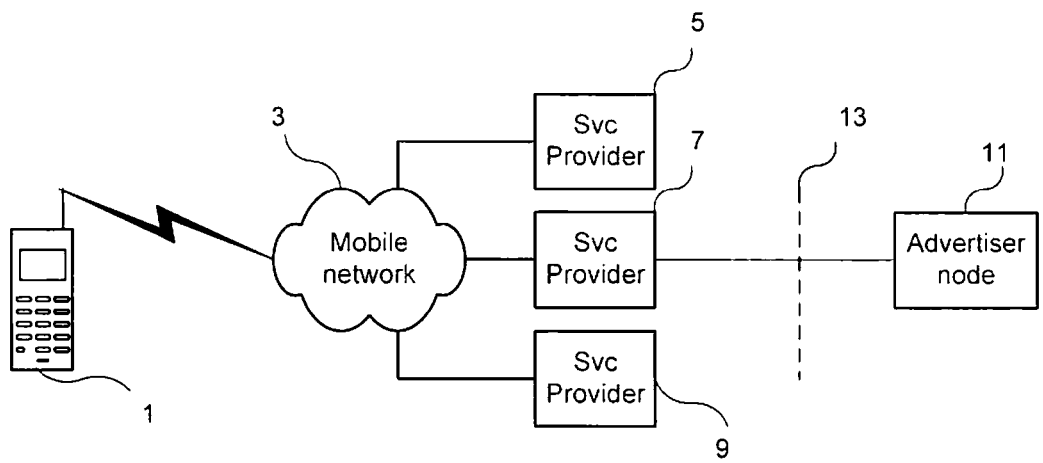
FIG. 1 is an overview of the basic components of a system employing the invention.

FIG. 1 shows an overview of the basic components of a system in which the invention may be used. A user of a mobile terminal 1 is a subscriber in a mobile communications network 3. Through the network 3 he is able to retrieve, on request, information from one of a number of service providers 5, 7, 9, to which he is subscribing. In this example, it will be assumed that the messages being provided to the subscriber are advertisements presented together with the information. Other examples will be given below.

This information can be any type of information in which a subscriber may be interested, for example, a time scheduling function, weather information, or information about sports events. To receive such information, the subscriber has accepted to receive a certain amount of advertising with it. Therefore, when the subscriber requests the desired information, the service provider also provides one or more advertisements. These advertisements must be in a form that is readable on the type of mobile terminal used by the subscriber. Of course, a subscriber may have several terminals, of different types, and utilizing different networks, so that the information cannot always be given on the same form, even to the same subscriber.

Statistics information may be collected as feedback to monitor the response to the message provided, for example, the result of an advertising campaign, in order to improve further advertising activities, and to improve targeting of advertisements in the future.

To enable the provisioning of a large number of advertisements, in several different formats, according to the invention a node 11 called the mobile Internet advertiser node is provided, and an interface 13 is provided between the node 11 and each service provider node 5, 7, 9 in the network. The interface 13, which will be referred to as the advertisement request interface, will be discussed in more detail below. Through the interface 13, a service provider node 5, 7, 9 can specify to the Internet advertiser node 11 type of terminal used, i.e. the access type, and preferably other parameters, such as the user identity. The Internet advertiser node 11 then returns an advertisement matching a subscriber profile and having the appropriate format to be displayed on the subscriber's terminal. Each service provider node 5, 7, 9 in the network provides services to the subscribers of one or more mobile operators. In addition to the advertisement request interface 13, a statistics interface (not shown in FIG. 1) through which statistical data may be communicated, may also be present between the Internet advertiser node 11 and the service provider nodes 5, 7, 9.

The subscriber's profile may comprise both static and dynamic data. The static data may relate to the type of service the subscriber is subscribing to, the subscriber's age, where he lives, information given about his hobbies, and other demographic parameters, and may be stored in a user profile database in the Internet advertiser. The dynamic data may be submitted each time the subscriber retrieves information from the service provider, and may include, for example, the type of terminal, the requested service and the subscriber's current geographical position.

To be able to present an advertisement to a subscriber, therefore, the service provider 5 sends a request for an advertisement to the appropriate Internet advertiser node 11, to fetch an advertisement based on certain targeting, or selection, parameters. The service provider handles the presentation (normally together with other service data) of the advertisement on the subscriber's terminal. At the same time, the service provider preferably collects events generated as a response to the advertisement. The responses are forwarded to the Internet advertiser node in a statistic request that builds up the advertiser's statistics. The service provider is responsible for opening and establishing the connection to the Internet advertiser node 11, including sending requests, reading back responses and keeping the connection open until the Internet advertising node responds. For the connection between the service provider and the Internet advertising node HTTP may be used, or, if a secure connection is desired, HTTPS.

The Internet advertiser node 11 can handle any type of advertisement, and stores and delivers advertisements in the format in which it should be displayed. Such advertisements are provided to the Internet advertiser node 11 by one or more content providers (not shown).

The advertisement information and the statistical information may be specified in a document, for example, according to XML (Extensible Mark-up Language), which is a meta-language allowing a customized description of the content to be exchanged with user defined tags.

The interface 13 is a specially developed external interface used by service providers to retrieve a correct advertisement based on various data entered into the system. The interface will include a number of parameters, most of which are optional, as will be discussed below. The Internet advertiser node 11 should provide the best-targeted advertisement based on these parameters.

The interface 13 may be based on XML over HTTP. The XML document will include a number of tags, all defined by a Document Type Definition (DTD). The reason for using XML is that many existing message systems use XML.

The following parameter must be supported by the interface:

Access Type: For example, Wireless Mark-up Language (WML), Hyper-Text Mark-up Language (HTML), compact HTML (C-HTML), XML, IP Telephony, Simple Mail Transfer Protocol (SMTP), Short Message Peer-to-Peer (SMPP). This data is necessary for the service provider to know which format may be used for this particular access. The Internet advertiser handles advertisements transparently and does not need to know anything about the actual format of the advertisement. An advertisement content provider can upload an advertisement of any format that is known to the advertisement request protocol and new formats could be added continuously as they are required.

In addition, the interface may support, for example, the following parameters, which are dynamic and may be used to select appropriate advertisements to be sent to a particular subscriber, either with respect to content or format or both.

Service provider: The identity of the service provider that entered the request. This is sent from the mobile service provider together with the other parameters in the advertisement request User identity: The identity of the user or of the user group Service: The identification of the service requested by the user Size: The service provider should check that the size of the advertisement does not exceed to limit stated in the request. This data should be set by the upload mechanism when the advertisement is registered in the system.

Position: The momentary geographical position of the user. The position is also dynamic data received from the mobile service provider. The position is entered as a text criterion when an advertisement is uploaded. If the position received from the mobile service provider is a complex data structure it may have to be translated by the mobile advertisement scheduler (see below) to a zip code or similar postal code that may be used as the input data for position in the Internet advertiser node. Alternatively, co-ordinates may be retrieved by means of any known method such as Global Positioning System (GPS) or triangulation between base stations. Several ways of implementing a positioning service are well known in the art.

Terminal type: Specifies the capability of the terminal. This parameter enables the service provider to choose an advertisement that is suitable for the type of terminal used by the subscriber. This can be handled automatically by a script for uploading an advertisement, if said script can set a category based on the size and the type of the advertisement. Instead of terminal type, an appropriate format for the advertisement may be stated.

Dynamic targeting data: Preferences entered by the subscriber or service provider regarding the type of advertisement in which the subscriber might be interested.

For collecting statistics a special interface may be provided between the service provider and the Internet advertiser node. This statistics interface preferably supports the following parameters, in addition to customer defined data:

Advertisement identity: the identity of the advertisement delivered to the subscriber User identity: the identity of the subscriber Time: the date and time for the interaction Interaction: the type of interaction, for example, if the subscriber who received an advertisement clicked on it. This information may be retrieved in some types of networks.

Customer specific data: This may be any type of data wanted by the customer.

All other dynamic parameters as defined in the advertisement request interface.

Of course, it would also be possible to provide advertisements in one or more of the service providers' nodes 5, 7, 9, or in any other node in the network. An interface according to the invention would then have to be provided between each node comprising such advertisements, and each node 5, 7, 9 that is capable of retrieving advertisements and forward them to a subscriber.

The Internet advertiser and how it work will be discussed in more detail in the following, with reference to FIG. 2. The Internet advertiser comprises a mobile advertisement scheduler 15, which should be able to use the same program to execute requests from all access types. The DTD should be enough flexible to handle requests from all accesses using XML/HTTP. This interface should be possible to use for any external access without a push client that wants to fetch a correct targeted advertisement, not necessarily only for mobile terminals. The process serving the interface, here called the mobile advertisement scheduler, will communicate with the outside world using the advertisement request interface 13 and the statistics interface 17. Alternatively, two processes may be used for the two different interfaces.

To determine which advertisement should be provided to a particular user, upon request from a service provider node, the mobile advertisement scheduler 15 retrieves information from a user profile database 19 found in or in connection to the Internet advertiser 11, which contains user profile data for each user. This information is matched with information found in an advertisement profile database 21 in or in connection to the Internet advertiser node 11, to decide which advertisement, and which version of the advertisement, to present. In this embodiment an advertisement database 22 is provided for the advertisements. According to a preferred embodiment the Internet advertiser node 11 also comprises a statistics database 23 for storing statistical data as will be discussed below.

Figure 2:
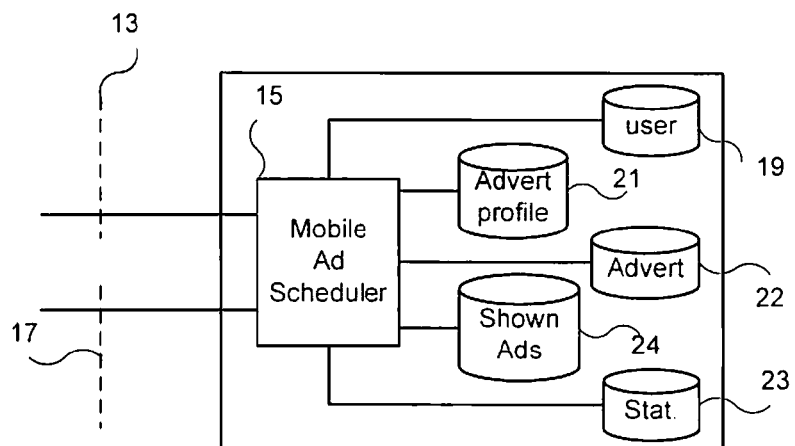
FIG. 2 is a more detailed view of a system employing the invention.

It will be obvious to the skilled person that the information could be divided on more databases than described above, or that two or more of the databases shown in FIG. 2 could be combined.

Since the terminal has no push client and since it is very rare that the mobile service provider saves the information regarding which advertisements have already been shown to a particular subscriber, the mobile Internet advertiser preferably stores this information in a separate "shown advertisements" database 24. The mobile advertising scheduler will then be able to determine how many times an advertisement has been shown to a certain user.

The following scenario is valid for the advertisement scheduler when receiving an advertisement request:

1. The mobile advertisement scheduler receives an advertisement request from an external service provider. The received DTD defines the parameters that are valid for this specific request. The mobile advertisement scheduler takes these parameters and calls a method, the findNextAd method, arranged to select the next advertisement to send to the subscriber concerned. The findNextAd method processes the received dynamic parameters, the static user parameters and the static advertisement parameters to find a correctly targeted advertisement.

2. The advertisement is returned together with a session identifier is also returned for later use for connecting external statistics information to the same session. The session identifier may simply be a counter that is stepped for each new request received. The advertisement scheduler also stores the statistical data that is available at this stage in the statistics database, i.e. dynamic data.

The following scenario is valid for the Internet advertiser when receiving a statistics request:

1. The mobile advertisement scheduler receives a StatisticsStoreRequest from an external system, normally the service provider, with parameters defined in the DTD. The mobile advertisement scheduler buffers the data for later storage in the database. This data indicates the session identity, in order to facilitate tying this transaction with other transactions related to the same session.

2. With a defined interval or if the buffer is getting full, the data is flushed to the database.

The findNextAd method should use as many parameters as possible to find the best choice of an advertisement. If, for example, the user identity is excluded it will only check against the enclosed dynamic parameters. Preferably, all dynamic parameters are handled in the same way as static parameters for advertisement matching and added as criteria in the advertisement upload page.

All dynamic data should be handled as ordinary criteria except for the size parameter. This data may be added to the database by an upload script when the advertisement is registered in the Internet advertiser system. The upload script must check the size of the advertisement and set the data in the database so that the findNextAd function can check the size at targeting time. This means that data cannot be compressed prior to registration and that the upload script should compress the data if necessary.

Interfaces should also be provided for storing advertisements and for registering new users. These are standard functions well known to the skilled person.

Figure 3:
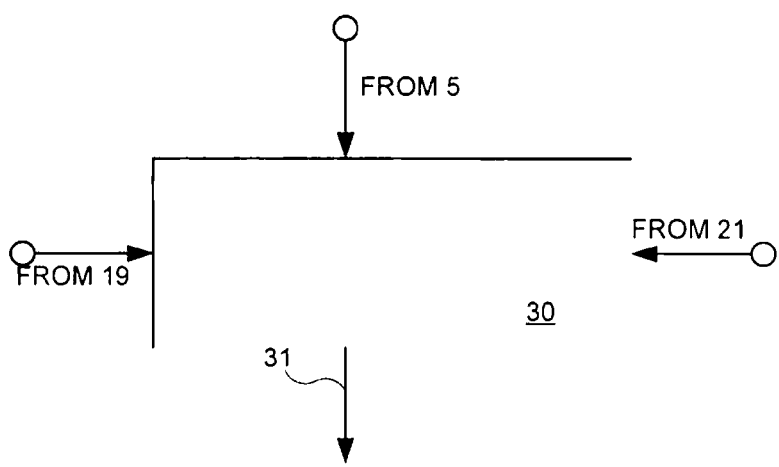
FIG. 3 shows the general principle for selecting the appropriate message for a particular subscriber.

FIG. 3 shows the general principle for selecting the appropriate message for a particular subscriber. A logical decision unit 30 receives three different types of input data:

The first type is static data related to the subscriber profile or service profile, from the user profile database 19, or from another database (not shown) comprising information about the service requested by the subscriber. The second type of data is dynamic data related to the subscriber or the service requested by the subscriber, received from the service provider when the advertisement is requested. The third type of information is related to the advertisement profiles, received from the advertisement profile database 21 and the "shown advertisements" database 24. The data related to the subscriber or service profile is matched with the data related to the advertisement profile, to find the best match. The output data, represented by an arrow 31, is the advertisement that constitutes the best match between the three different types of data. This advertisement is then retrieved from the advertisement database 22 and provided to the service provider to be forwarded to the subscriber.

Although the invention was discussed in the above using advertising as an example, it should be understood that it can also be used for providing other types of information to subscribers. For example, it may be used to send information about new assignments to service personnel who may need to receive such information several times during the day, for example, depending on the geographical location. Such information could be prompted, for example, by a message from the service engineer stating that a previous task has been completed. The method and apparatus according to the invention could also be used to transmit information to emergency personnel about accidents etc., that need to be attended to. The message to be provided to the subscriber does not have to be added to other information or prompted in any other way.

The invention claimed is:

1. A method of providing at least one message to a user terminal coupled to a service node in a communications network, said communications network comprising a library node connected to the service node, the library node comprising at least a first and a second version each of a first message and a second message, said first and second versions for display on user terminals using first and second access types respectively, said method comprising the following steps:
   - the user terminal requesting information from the service node, the service node forwarding the request to the library node, said request including the user identity;
   - the library node matching the user identity to a stored user profile, said profile including a required format for displaying a message on the user terminal;
   - the library node sending a first message to the service node containing the requested information to the service node in the required format;
   - sending a second message to the service node containing additional information based on parameters included in the user profile; and
   - the service node forwarding the first and the second messages to the user terminal.

2. The method according to claim 1, further comprising specifying in said request at least one parameter to be used when selecting the information to be provided from the library node to the service node, and selecting a message from the library node in accordance with said at least one parameter.

3. The method according to claim 2, the requesting step being initiated by the step of requesting a service from the service node to the user terminal.

4. The method according to claim 3, said at least one parameter including information about the service requested.

5. The method according to claim 2, said at least one parameter including information regarding the momentary geographical position of the user terminal.

6. The method according to claim 2 said at least one parameter including information about the capabilities of the user terminal.

7. The method according to claim 2, said at least one parameter including information about the identity of the user of the user terminal.

8. The method according to claim 1, the user terminal being a mobile terminal and the network being a mobile communications network.

9. A service node in a communications network for providing information and messages to a user terminal, said network comprising a library node connected to the service node, the library node comprising at least a first and a second version each of a first message and a second message, said first and second versions for display on user terminals using first and second access types respectively, said service comprising:
   - means for forwarding a request for information from the user terminal to the library node, said request including the user identity and the library node utilizing the user identity for matching to a user profile associated with the user identity, said profile including a required format for displaying a message on the user terminal;
   - means for receiving a message from the library node, the message containing the requested information to the service node in the required format;
   - means for receiving a second message from the library node containing additional information based on parameters included in the user profile; and
   - means for forwarding the first and the second messages to the user terminal.

10. The service node of claim 9, further comprising:
    - means for connecting to a first interface comprising a number of parameters, including:
    - service provider identity, user identity, identification of a service requested by the user terminal, size limit of the second message, geographical position of the user terminal, terminal type and user preferences regarding advertisement.

11. The service node of claim 9, further comprising:
    - means for connecting to a second interface, the second interface comprising a number of parameters, including:
    - advertisement identity, the user identity, date and time of request for information, type of request, data required by user, and other dynamic parameters defined in the second interface.

12. The service node of claim 9, the second message being an advertisement provided to the service node according to parameters in the user profile and the advertisement is retrieved from a database of stored advertisements.

* * * * *